Aug. 14, 1923.

D. C. STOPPENBACH
DRIVING MECHANISM
Filed May 28, 1920

Inventor
Donald C. Stoppenbach
By his Attorney's
Pennie, Davis, Marvin and Edmonds.

Aug. 14, 1923.
D. C. STOPPENBACH
DRIVING MECHANISM
Filed May 28, 1920
1,464,684
4 Sheets-Sheet 2
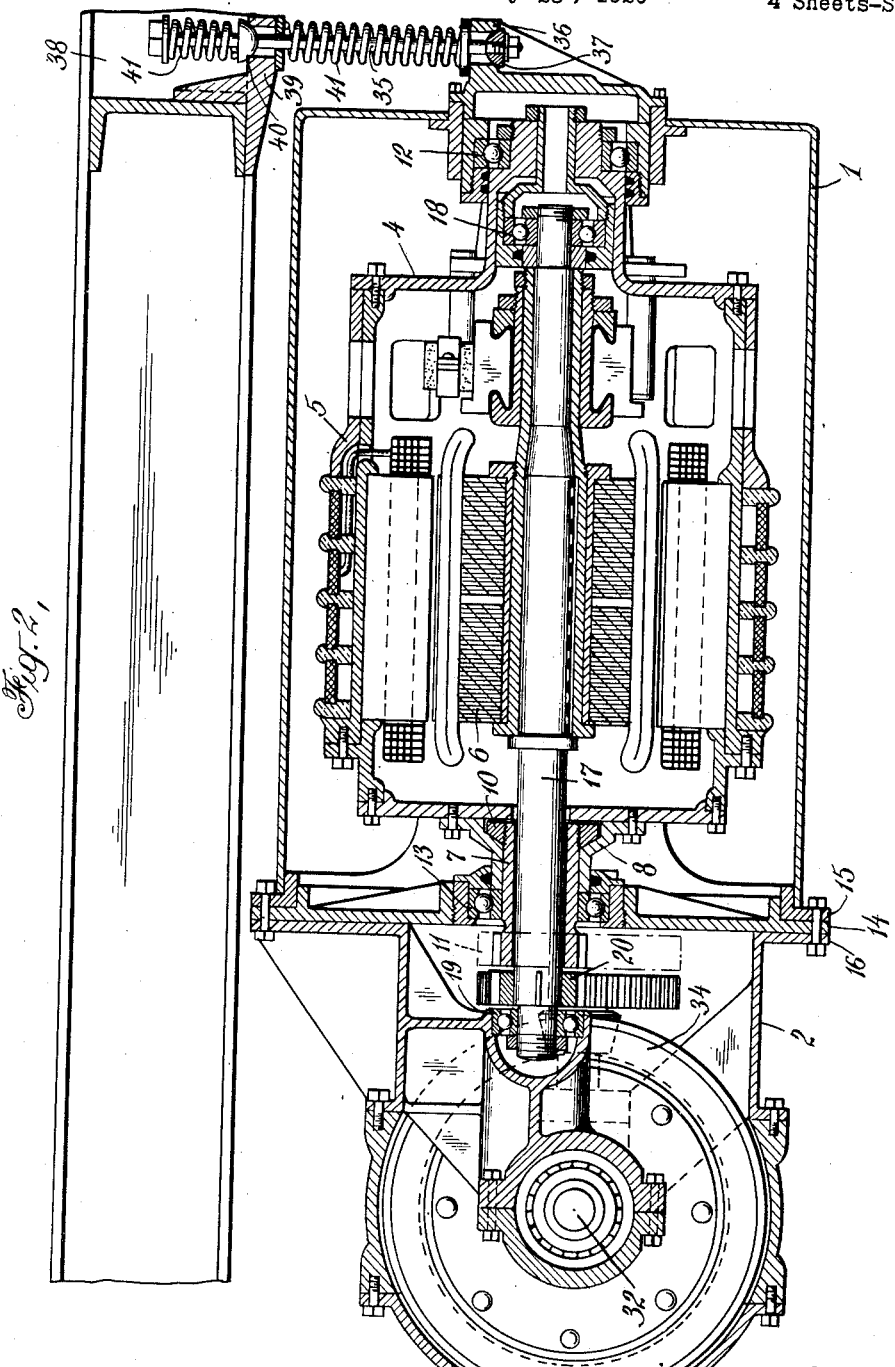
Inventor
Donald C. Stoppenbach
By his Attorney's
Pennie, Davis, Marvin & Edmonds.

Aug. 14, 1923.
D. C. STOPPENBACH
DRIVING MECHANISM
Filed May 28, 1920
1,464,684
4 Sheets-Sheet 3
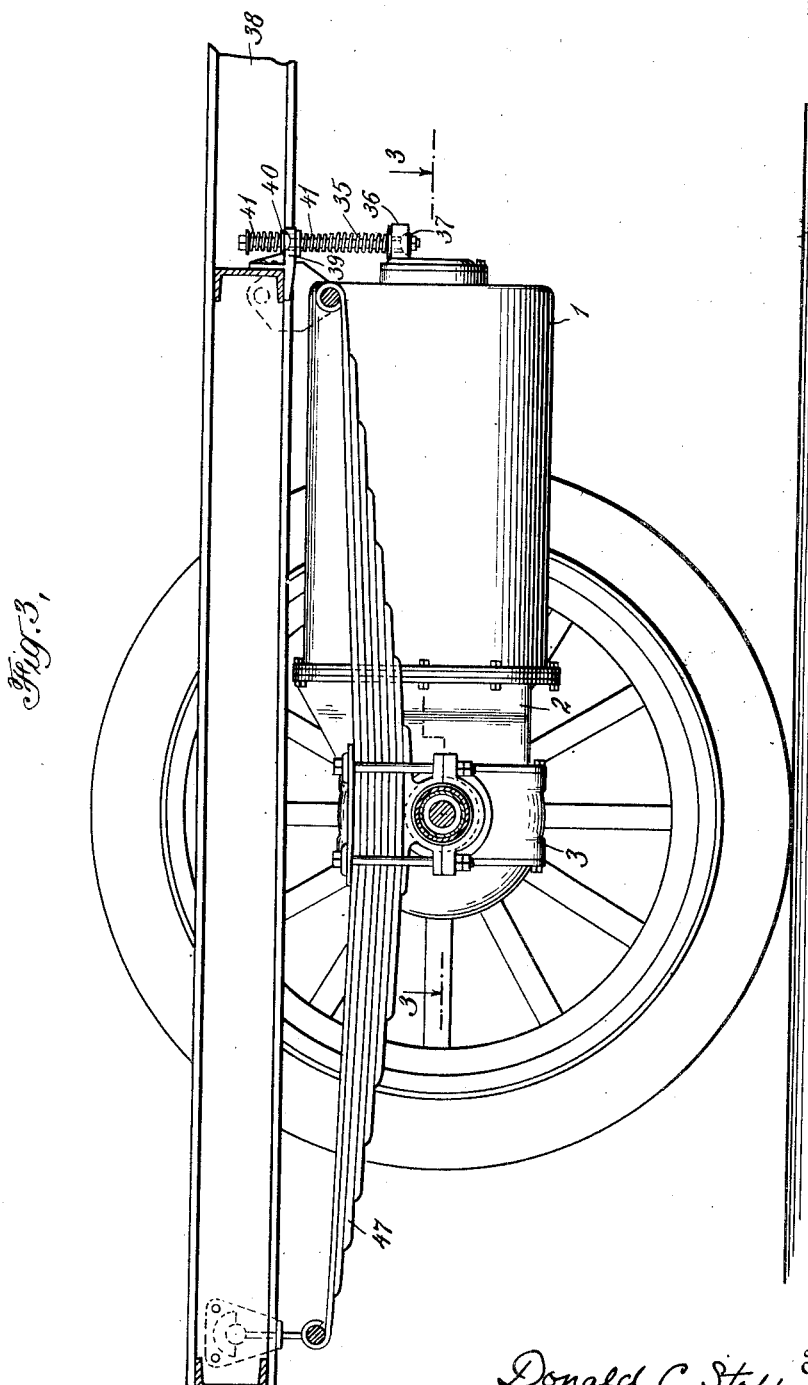

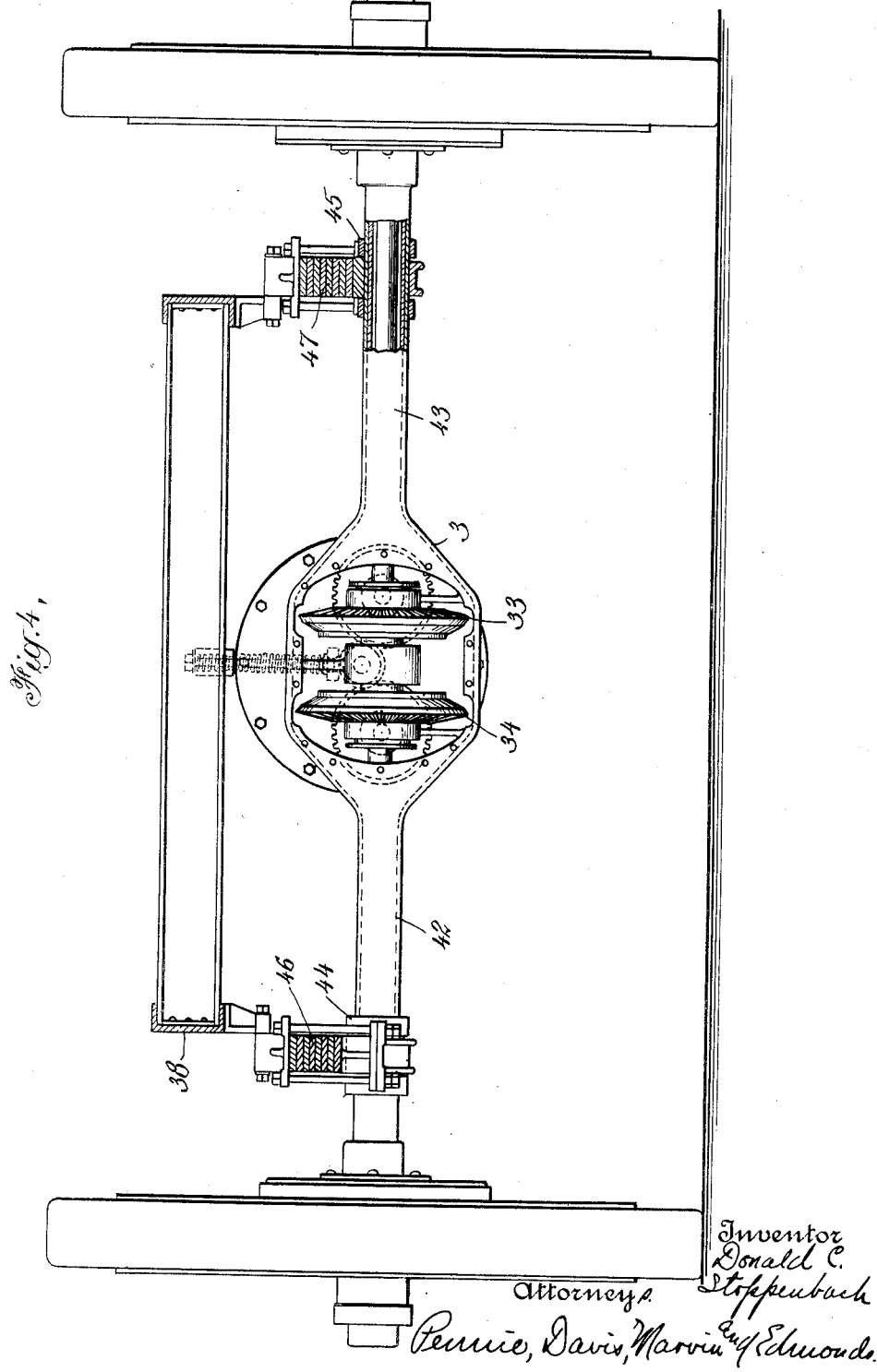

Patented Aug. 14, 1923.

1,464,684

UNITED STATES PATENT OFFICE.

DONALD C. STOPPENBACH, OF NEW YORK, N. Y., ASSIGNOR TO STEINMETZ ELECTRIC MOTOR CAR CORPORATION, OF NEW YORK, N. Y., A CORPORATION OF MARYLAND.

DRIVING MECHANISM.

Application filed May 28, 1920. Serial No. 384,792.

*To all whom it may concern:*

Be it known that I, DONALD C. STOPPENBACH, a citizen of the United States, residing at New York, in the county of New York, State of New York, have invented certain new and useful Improvements in Driving Mechanism; and I do hereby declare the following to be a full, clear, and exact description of the invention, such as will enable others skilled in the art to which it appertains to make and use the same.

This invention relates to the transmission of power and has for its object the provision of a simple, compact and light motor and driving mechanism particularly adaptable for use in vehicles.

To this end provision is made for the use of a dual rotation motor having two elements, which rotate in opposite directions, mounted with the axes of rotation of the elements at right angles to the driving axles of the vehicle. Further provision is made for the independent gearing of the oppositely rotating elements to the driving wheels of the vehicle so as to eliminate the necessity of providing a differential. In this way each of the rotating elements drives one of the wheels of the vehicle, and because of the independent driving connections an inequality in the speed of rotation of the oppositely rotating elements provides differential action to permit the turning of corners, etc., or, in general, of the rotation of one of the driving wheels at a higher speed than the other. It is to be understood, however, if the driving mechanism is used for other purposes than for vehicles, suitable provision may be made for the maintenance of equal loads on the respective oppositely rotating elements since in the case of a vehicle the independently driven axles are effectively tied together by the friction of traction on the road and therefore tend to rotate at the same speed, or, at such different speeds as are required on curves, etc.

The invention is readily adaptable for use in electric storage battery vehicles and a dual rotation electric motor whose fiend and armature both revolve, may be used to drive the wheels of a vehicle thru suitable reduction gearing. As a result of the elimination of a differential, a simpler and more compact power plant is obtained, with a corresponding saving of weight, and a saving of the usual power losses in a differential.

Due to the high relative speed of rotation of the electric motor obtainable by reason of the oppositely rotating armature and field, a smaller motor for a given power may be used than if a motor in which only one element revolves, was provided. Higher operating efficiency is also obtained in this way with a resulting economy of power and a corresponding increase of mileage with a given storage battery capacity.

The particular transmission and reduction gearing contemplated to be used in the preferred embodiment of this invention, as applied to vehicles, comprises two spur gears, one mounted on the armature shaft, the other integral with a bushing or hollow shaft fastened to the rotating field structure of the electric motor. These gears in turn, are meshed respectively with two spur gears mounted on countershafts within the reduction gear casing. The two spur gears driven by the two rotating elements of the electric motor may have the same pitch-diameter, and likewise the two spur gears meshing with each of these gears, may have equal pitch-diameters. The countershafts upon which the spur gears are mounted are each provided with bevel gears of equal size which mesh respectively, with bevel gears mounted on each of the independently driven driving axles of the rear wheels.

In this system of gearing all of the gears, both spur and bevel, are interchangeable, with the exception of the spur gears mounted respectively, on the armature shaft and the spur gear integral with the bushing, although these two gears are of the same size. This feature is of considerable importance not only because of the resulting economy in manufacturing costs, but also it results in a simplification of the work of assembling the driving and gearing mechanism during initial assembly, or in the course of repairs. A further advantage of this type of power unit and reduction gearing is that it utilizes spur gears on all of the shafts which transmit power while rotating at relatively high peripheral speeds.

Any objectionable thrust which might readily occur if the integral gear and bushing was journaled on the armature shaft is avoided by supporting a bearing for the bushing by means of a spider rigidly fastened between the reduction gear casing and the motor casing. In this way, all shocks and strains are transferred to the casings and the rotating field structure is continuously maintained in proper alignment. By the use of separate bearings at the forward ends of the armature shaft and the hollow shaft driven by the field structure, slight longitudinal motion of the respective shafts may be provided for by end play in their respective bearings. This eliminates the necessity for adjustable bearings and the armature and field will automatically tend to maintain their proper electrical and mechanical relations.

The facility with which both the power unit and mounting may be taken down, or partially unassembled for the purposes of repair, is a further feature of this invention, and it is inherent in the construction and arrangement of the motor and transmission and reduction gearing. The arrangement of the motor, the transmission and reduction gearing and the gear reduction casing and motor casing, as well as other objects and advantages of the invention, will be more clearly understood from a description of certain preferred embodiments thereof, as illustrated in the accompanying drawings, in which:—

Fig. 2 is a sectional front view of the motor and motor casing, reduction gearing and reduction gear casing and rear axle housing;

Fig. 3 is a view of the rear portion of the chassis of an electric vehicle showing the motor casing and gear reduction casing; and Fig. 4 is an end elevation of the chassis, partly in section, the cover of the central portion of the rear axle housing being removed.

Figure 1:
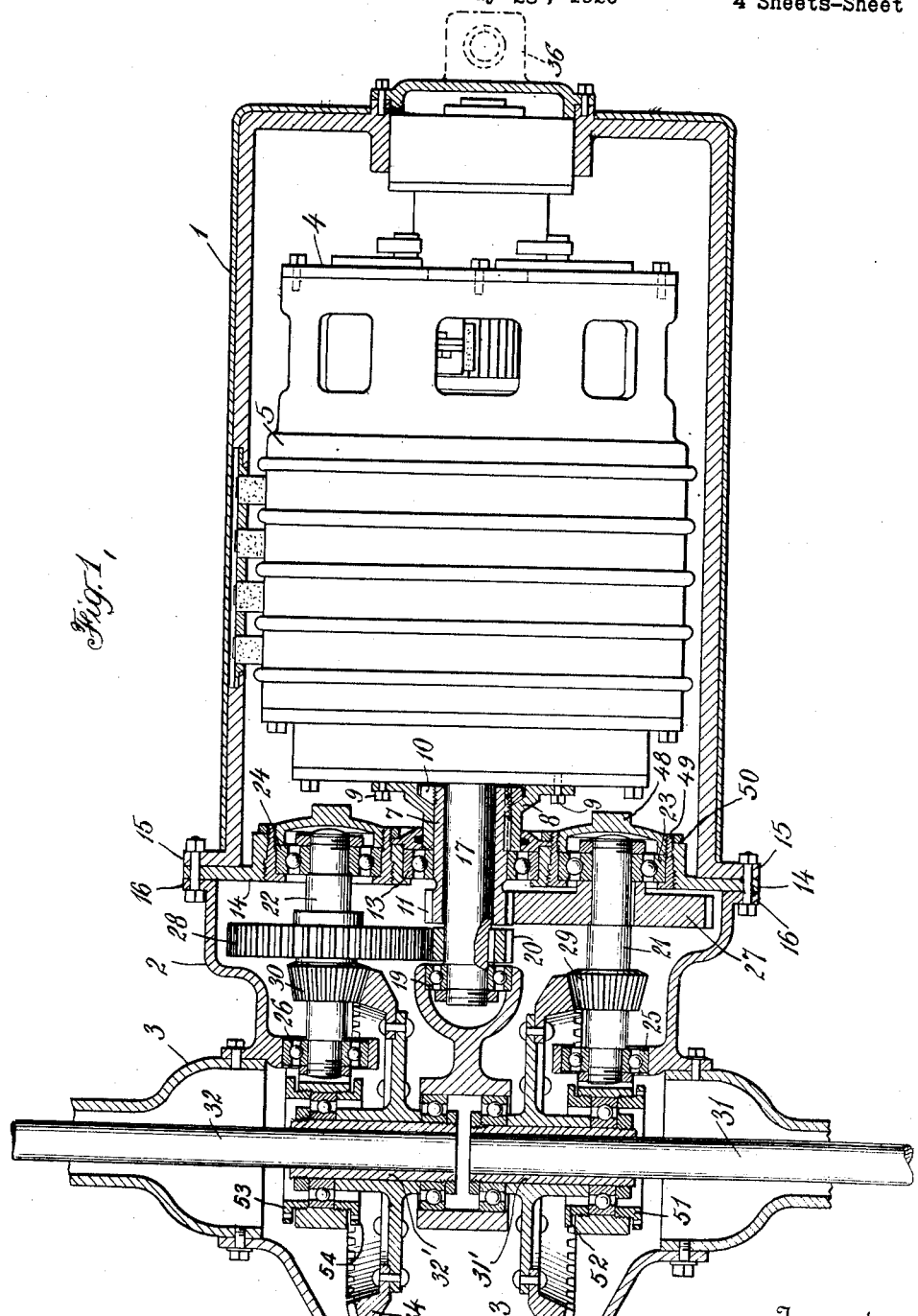
Fig. 1 is sectional view of the motor casing, reduction gearing, gear reduction casing, and the rear axle housing, taken along 3—3 of Fig. 3.

In these drawings, particularly Figs. 1, 2 and 3, the motor casing 1, the gear reduction casing 2, and the rear axle housing 3 are rigidly bolted together to obtain a single compact power and drive unit. The electric motor 4 is of the dual rotation type in which both the field structure 5 and the armature 6 rotate in opposite directions. The field structure 5 drives the bushing or hollow shaft 7 by means of a sleeve 8 fastened to the field structure 5 by bolts 9, the bushing lock-nut 10 effectively locking the bushing 7 to the sleeve 8. Integral with the bushing 7 and at its extremity, a spur gear 11 is formed. The field structure 5 is provided with a front bearing 12 supported by the motor casing 1 and with a rear bearing 13 supported by a grease baffle and bearing spider 14 which in turn is bolted between the flanges 15, 16 of the motor casing and reduction gear casing, respectively. The motor armature shaft 17 is provided with a front bearing 18 and a rear bearing 19. This construction avoids any objectionable thrusts which might readily occur if the field structure was journaled on the armature shaft. The spider 14 also serves as a separator to prevent grease entering the motor casing 1 from the reduction gear casing 2.

The spur gears 11 and 20, respectively, drive the countershafts 21 and 22. These shafts are supported at one extremity by the bearings 23 and 24, respectively, in the bearing spider 14, and at the other extremity by the bearings 25 and 26, respectively, supported by the reduction gear casing 2. The shafts 21 and 22 are each provided with spur gears 27 and 28 of equal pitch-diameter, and mesh with, and are driven by the spur gears 11 and 20, which are also of equal pitch-diameter. The bevel gears 29 and 30 mounted on the shafts 21 and 22, respectively, are also of equal size.

The two independent drive shafts 31 and 32 which may be connected to the driving wheels of a vehicle, are adapted to be driven respectively, by the bevel gears 33 and 34, which are of equal size. These bevel gears in turn mesh with, and are driven by the bevel gears 29, 30 on the countershafts 21, 22.

In this system of gearing all of the gears, both spur and bevel, are interchangeable with the exception of the spur gears 11 and 20. This feature is of importance because it facilitates the initial assembly of the power and drive unit as well as an assembly in the course of repairs.

Provision is also made for the longitudinal adjustment of the countershafts 21, 22 and of the sleeves 31' and 32' which are splined to the drive shafts 31 and 32, respectively, to bring the bevel gears 29, 30 and the bevel gears 33, 34 into proper mesh. The gears 33 and 34 are mounted upon and may be keyed to the sleeves 31' and 32', respectively. The adjustment of the countershaft 21 is made by the cap 48 which locks the bearing 23 into a sleeve 49, the sleeve being threaded into the bearing spider 14. By turning the cap, which for convenience has a hexagonal head, the bearing 23 may be adjusted in either direction. The cap is provided with a lock-nut 50 to hold it against rotation after an adjustment has been made. Similar provision is made for adjusting the bearing 24. The sleeve 31' upon which is mounted the bevel gear 33, may be displaced in one direction or the other by means of the outside bearing adjustor 51 and the inside bearing adjustor 52. The sleeve 32' is also provided with similar bearing adjustors 53, 54.

Under normal running conditions, for example, when driving a vehicle in a straight line path, the motor armature 6 and the field structure 5 will rotate at equal speeds in opposite directions and will drive the main shafts 31 and 32 in the same direction at equal speeds. If, however, the vehicle is directed around a corner, or, in general, is directed in a manner requiring one of the driving wheels to rotate at a higher speed than the other, the necessary differential action is automatically provided between the oppositely rotating armature 6 and the field structure 5. This automatic differential action is equivalent to that obtained with an ordinary differential.

The dual rotation electric motor 4 may be constructed in accordance with any of the well known designs of this type of motor, but a motor such as that described in my copending application (Case B) filed concurrently herewith, is preferred. The electric motor 4 is also reversible thereby enabling the vehicle to be driven either forward or backward according to the direction of rotation of the armature and field structure, respectively.

Referring now particularly to Figs. 2, 3 and 4, the power and drive unit comprising the motor casing 1, the gear reduction casing 2 and the rear axle housing 3 is flexibly supported at the front end of the motor casing 1, by means of a motor hanger bolt 35 fastened to the motor casing 1, by means of a ball and socket supporting bracket 36 bolted to the motor casing 1, and housing a ball and socket joint 37 of which the motor hanger bolt 35 forms an integral part. The motor hanger bolt 35 is resiliently supported by the chassis frame 38 by means of the motor hanger bracket 39, the resilient connection being obtained through the action of the ball and socket joint 40 and the torque absorbing and suspension springs 41. The portions 42 and 43 of the rear axle housing 3 serve as journals for the rear spring seat bearings 44 and 45, thus permitting the chassis and the rear springs 46 and 47 to freely rotate about the rear axle housing. This type of flexible mounting is particularly advantageous because of its shock absorbing qualities and it is fully described in my copending application (Case C) filed concurrently herewith.

I claim:—

1. A driving mechanism comprising a motor having two elements adapted to rotate in opposite directions, a shaft driven by one of said elements, a hollow shaft concentric with said first-mentioned shaft driven by the other of said elements, a spur gear mounted on each of said shafts, two countershafts each having a spur gear meshing with one of the spur gears on said main shafts, a bevel gear on each of said countershafts and two independently driven shafts each having a bevel gear thereon and each adapted to mesh with and be driven respectively, by the said bevel gears on the countershafts, the spur gears on said countershafts being substantially larger than the spur gears on said main shafts, whereby a speed reduction is effected by means of said spur gears.

2. A driving mechanism comprising a motor having two elements adapted to rotate in opposite directions, a casing therefor, a shaft driven by one of said elements, a hollow shaft concentric with said first mentioned shaft driven by the other of said elements, reduction gearing, a casing therefor, a spider between said casings, separate forward bearings supported by said motor casing for said shafts, a rear bearing for one of said shafts supported by the spider and a rear bearing for the other of said shafts supported by said gear reduction casing.

3. A driving mechanism comprising an electric motor having its armature and field structure adapted to rotate in opposite directions, a casing therefor, an armature shaft, a hollow shaft concentric with said armature shaft adapted to be driven by said field structure, reduction gearing, a casing therefor, a spider between said casings and secured to said casings, separate forward bearings for said armature and field shafts supported by said motor casing, an independent rear bearing for said field shaft supported by said spider and an independent rear bearing for said armature shaft supported by said gear reduction casing.

4. In an electric vehicle, a power and drive unit comprising a dual rotation electric motor having an oppositely rotating armature and field, a casing therefor, reduction gearing adapted to be driven by said armature and field, a casing therefor, a spider separating said gear reduction casing from said motor casing, said motor being supported by a bearing in said spider and a bearing in said motor casing, independently driven rear driving axles arranged at right angles to the axis of rotation of said armature and field and a casing therefor, said casings adapted to be rigidly secured together.

5. A driving mechanism comprising a motor having two elements adapted to rotate in opposite directions, a shaft driven by one of said elements, a hollow shaft concentric with said first-mentioned shaft adapted to be driven by the other of said elements, two countershafts adapted to be driven by said main and hollow shafts, respectively, a gear mounted on each countershaft, an adjustable bearing for each countershaft, two independently driven drive shafts arranged at right angles to said countershafts, a gear on each drive shaft mounted on a sleeve, said sleeves being splined to said shafts, an adjustable bearing for each of said sleeves, each of said drive shafts adapted to be driven independently of each other by said countershafts through the said gears, said adjustable bearings adapted to permit the said gears to be brought into proper mesh.

In testimony whereof I affix my signature.

DONALD C. STOPPENBACH.